(12) United States Patent
Ngo et al.

(10) Patent No.: US 7,475,120 B1
(45) Date of Patent: Jan. 6, 2009

(54) AUTO REMOVAL OF SENT ATTACHMENTS

(75) Inventors: Khanh V. Ngo, Tucson, AZ (US); Shannon H. Chang, Vail, AZ (US); Jose G. Miranda Gavillan, Tucson, AZ (US); Angqin Bai, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,676

(22) Filed: Mar. 10, 2008

(51) Int. Cl.
*G06F 15/16* (2006.01)

(52) U.S. Cl. ............... 709/206; 709/204; 709/205; 709/207; 707/1; 370/260

(58) Field of Classification Search ............ 709/204, 709/205, 206, 207; 370/260, 338; 345/1.1–3.4; 715/733–759; 379/93.01; 707/1
See application file for complete search history.

(56) References Cited

U.S. PATENT DOCUMENTS

| | | | |
|---|---|---|---|
| 6,256,666 B1 | 7/2001 | Singhal | |
| 6,275,848 B1 | 8/2001 | Arnold | |
| 6,360,252 B1 | 3/2002 | Rudy et al. | |
| 6,625,620 B1 | 9/2003 | Tagg | |
| 6,907,452 B1 * | 6/2005 | Malik | 709/206 |
| 7,003,551 B2 * | 2/2006 | Malik | 709/206 |
| 7,191,219 B2 * | 3/2007 | Udell et al. | 709/206 |
| 7,194,514 B1 | 3/2007 | Yen et al. | |
| 7,403,983 B2 * | 7/2008 | Ueno et al. | 709/223 |
| 2002/0138586 A1 | 9/2002 | Paleiov et al. | |
| 2003/0031309 A1 * | 2/2003 | Rupe et al. | 379/265.02 |
| 2003/0126215 A1 * | 7/2003 | Udell et al. | 709/206 |
| 2004/0172453 A1 * | 9/2004 | De Mendonca et al. | 709/206 |
| 2005/0052692 A1 | 3/2005 | Buschi et al. | |
| 2005/0086315 A1 * | 4/2005 | Malik et al. | 709/206 |
| 2005/0102361 A1 | 5/2005 | Winjum et al. | |
| 2006/0031309 A1 | 2/2006 | Luoffo et al. | |
| 2006/0095527 A1 | 5/2006 | Malik | |
| 2006/0168061 A1 * | 7/2006 | Enatsu et al. | 709/206 |
| 2007/0078902 A1 | 4/2007 | Buschi et al. | |
| 2007/0180035 A1 | 8/2007 | Liu et al. | |
| 2007/0185970 A1 | 8/2007 | Arenburg et al. | |

OTHER PUBLICATIONS

S. Johnson, "Automatic Note Log File Cleaner," TDB v37 n3 Mar. 1994 p. 233-234.

L. Lassiter et al., "Mail Server Storage Economizer working across User email Accounts," RD n429 Jan. 2000 A.

* cited by examiner

*Primary Examiner*—Thu Ha T Nguyen
(74) *Attorney, Agent, or Firm*—Carpenter & Assoc.; Robert K. Carpenter

(57) ABSTRACT

Removing attachments from sent e-mails, including: providing a selectable e-mail setting to delete attachments from copies of e-mails saved in a sent folder on an e-mail server, such that a user is provided with choices as to when attachments are to be deleted; the e-mail user selecting whether attachments are automatically deleted prior to saving sent e-mails or selecting a specific amount of time before the attachments are automatically deleted; the e-mail user composing an e-mail and attaching at least one attachment to the e-mail; sending the e-mail with the at least one attachment to at least one other user; saving a copy of the e-mail in the sent folder either (a) without saving any of the at least one attachment, or (b) with the at least one attachment, and then deleting the at least one attachment after the specific amount of time.

1 Claim, 1 Drawing Sheet

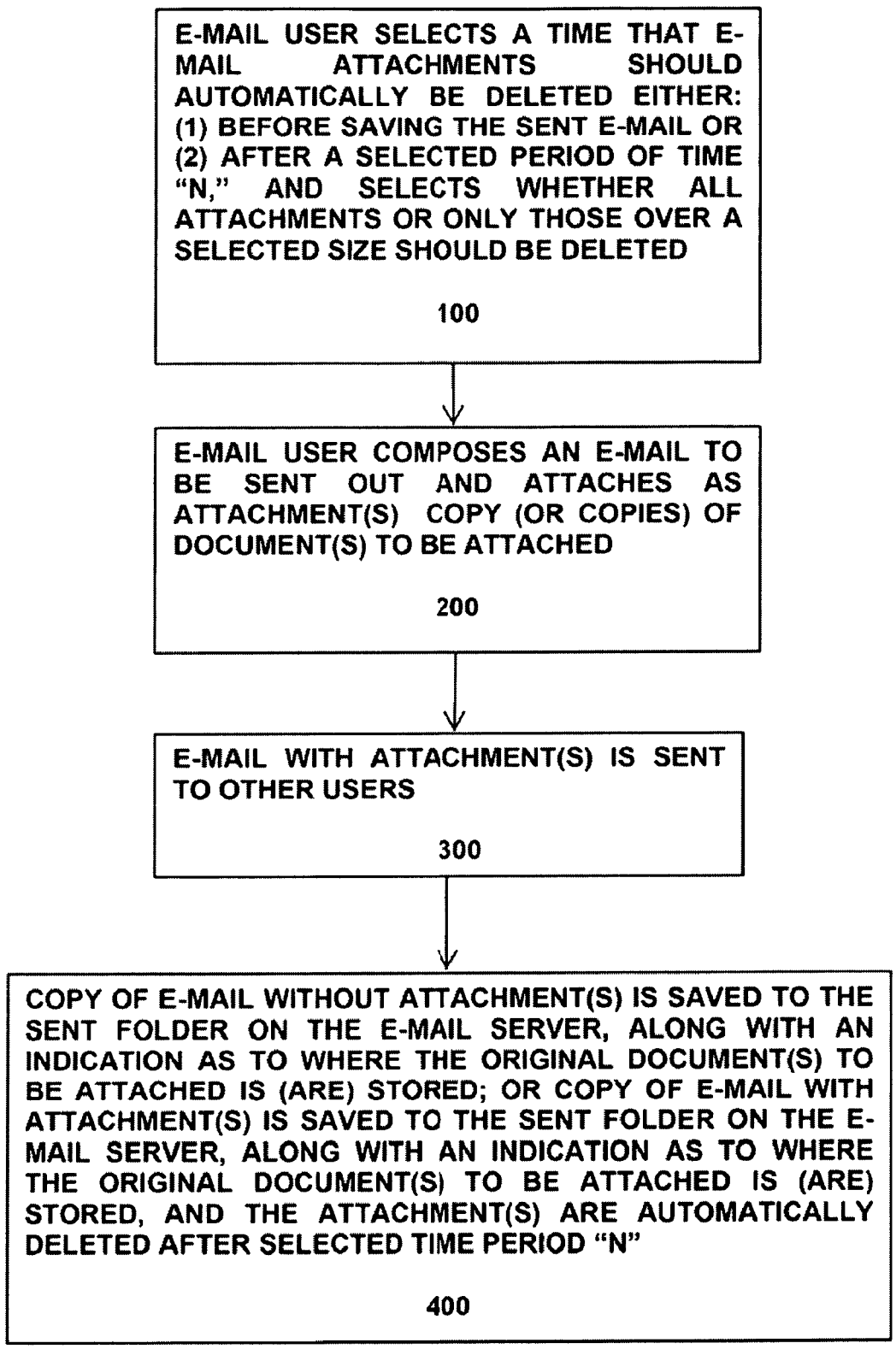

AUTO REMOVAL OF SENT ATTACHMENTS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTY TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This disclosure is directed to a method for automatically removing attachments from sent e-mail.

2. Description of Related Art Including Information Submitted under 37 CFR 1.97 and 1.98

Malik (U.S. Patent Application Publication No. 2006/0095527) discloses a method and apparatus for minimizing storage of common attachment files in an e-mail communication server. The Malik abstract states that the Malik "invention provides an e-mail communication system that minimizes the number of duplicate copies of common attachment files to e-mail communications that are stored in the mail store of an e-mail server . . . [and] attachment files are deleted only after the recipients of the associated e-mail communications delete each of the respective e-mails. See also the related patent to Malik (U.S. Pat. No. 7,003,551).

The abstract of Winjum et al. (U.S. Patent Application Publication No. 2005/0102361) discloses attachments that "are configured to have a data field indicating if the attachment is to persist when a corresponding electronic message is deleted."

Tagg (U.S. Pat. No. 6,625,620) discloses a method "of creating a plurality of attachment databases to contain . . . attachments; and embedding an attachment engine within . . . applications for creating, deleting, and re-using said attachments in said plurality of attachment databases"(see the abstract of Tagg).

BRIEF SUMMARY OF THE INVENTION

At least some aspects of this disclosure are directed to a method for automatically removing attachments from sent e-mail.

More particularly, aspects of this disclosure are directed to a method of removing attachments from sent e-mails, including: providing a selectable e-mail setting to delete attachments from copies of e-mails saved in a sent folder on an e-mail server, such that a user is provided with choices as to when attachments are to be deleted, including at least choices of (a) prior to saving the sent e-mails and (b) a specific amount of time after the sent e-mails are saved, and also including at least choices of (c) deleting all attachments and (d) deleting only attachments larger than a selected size; the e-mail user selecting whether attachments are to be automatically deleted from sent e-mails prior to saving the sent e-mails in the sent folder or selecting a specific amount of time before the attachments are to be automatically deleted, and the e-mail user also selecting whether all attachments or only attachments larger than a selected size are to be automatically deleted; the e-mail user composing at least one e-mail to be sent out and attaching to the at least one e-mail at least one attachment of a copy of at least one document to be attached; sending the at least one e-mail with the at least one attachment to at least one other user; saving a copy of the at least one e-mail in the sent folder on the e-mail server either: without saving any of the at least one attachment if the e-mail user selected deleting prior to saving sent e-mails and with an indication including a pointer as to where the at least one document to be attached is stored, wherein the indication also includes name of the at least one document, size of the at least one document and type of the at least one document; or with saving the at least one attachment, along with an indication including a pointer as to where the at least one document to be attached is stored, wherein the indication also includes name of the at least one document, size of the at least one document and type of the at least one document, and then deleting the at least one attachment after the specific amount of time; providing the e-mail user an override option to override an automatic attachment deletion setting.

At least some other aspects of this disclosure are directed to a system for automatically removing attachments from sent e-mail.

Still other aspects of this disclosure are directed to an organization such as a business utilizing the system and/or methods described in this disclosure for automatically removing attachments from sent e-mail.

Yet other aspects of this disclosure are directed to a storage device, such as a computer or a storage medium or media, such as a disk or the like, that includes software for operating the systems and methods of this disclosure for automatically removing attachments from sent e-mail.

Other exemplary embodiments and advantages of this disclosure can be ascertained by reviewing the present disclosure and the accompanying drawing.

BRIEF DESCRIPTION OF THE SEVERAL VIEWS OF THE DRAWING(S)

This disclosure is further described in the detailed description that follows, with reference to the drawing, which shows a flow chart illustrating an exemplary embodiment of a method for automatically removing attachments from sent e-mail.

DETAILED DESCRIPTION OF THE INVENTION

Exemplary embodiments of this disclosure are described herein by way of example.

As mentioned, at least one aspect of this disclosure is directed to a method for automatically removing attachments from sent e-mail.

E-mail users often send e-mails with attachments. Conventional client e-mail services can be set up to save a copy of the sent e-mail in a sent directory such that, at a later time, the e-mail users can pull up the sent e-mail and utilize the sent e-mail as reference or to re-send.

However, with such an approach, two copies of an attachment are very likely retained. In particular, one copy of the attachment is retained in an e-mail user's sent box and one copy of the attachment (actually the document prior to being attached) is likely stored in the e-mail user's local resources somewhere since the e-mail user attached the file at some time to create the attachment.

Such duplicate files not only take up space on the server for the sent e-mail, but also result in redundant copies of the same file taking up storage space in two locations.

As the mailbox size of an e-mail user becomes larger every time the e-mail user saves a sent mail with an attachment, the e-mail user is likely utilizing their allotment of e-mail space on a server. At some point, if the e-mail user desires to free up space, the e-mail user can utilize one of the following tedious processes:

1. delete the e-mail with the attachment on it, resulting in loss of both the attachment and the corresponding e-mail;
2. if the e-mail service allows removal of e-mail, a User can go through e-mails one at a time and delete e-mail attachments that are large;
3. have the system administrator increase the mailbox size, which takes up additional space on a server.

This disclosure is directed to a method and/or system that checks sent e-mail for attachments. In at least some embodiments, an e-mail user can either set the system to remove all attachments and only save the bodies of e-mail, or set a size limit and only save attachments that are of a certain size.

The e-mail attachments can be removed, for example by:

1. Automatically removing the attachments before they are saved into their sent e-mail box or storage;
2. Saving the e-mail into sent e-mail storage and then checking their sent e-mail box or storage and removing attachments at some later time;
3. An e-mail user can specify the system to remove all attachments from their sent e-mail box or storage.

The embodiments of this disclosure can result in the saving of space on an e-mail server; can provide an automated system and method to remove attachments to save space; can remove redundancy of files in different locations; and can allow e-mail users to maintain an e-mail body while removing attachments from the e-mail.

In at least some embodiments of this disclosure, when the email attachment is deleted, it can be helpful to include some indication to the email of what the deleted attachment was. For example, instead of the actual attachment, the attachment can be replaced with some text as to the name of the file, size of the file, type of the file, and last date/time modified (other relevant details can be added as well). This can allow the user to recall (i.e. open document from his local computer) if there was a need to open the attachment again, yet still saving space on the email server. This can also help with this issue of tracking.

An exemplary embodiment of the method is described below in conjunction with the attached FIGURE:

1. At 100 in the FIGURE, an e-mail User sets up settings to remove attachments automatically when saving sent e-mails. The user can select that all attachments, or only those over a certain size, (a) are to be removed automatically before saving the e-mail, or (b) the attachments are to be saved with the e-mail and then automatically deleted after a period of time "N" selected by the User.
2. At 200, the User composes an e-mail to be sent out and attaches one or more attachments to the e-mail to be sent out.
3. At 300, an e-mail with one or more attachments is sent to one or more other users.
4. At 400, a copy of the e-mail without attachments is saved in the sent folder on the e-mail server, or, alternatively, a copy of the e-mail with attachments is saved in the sent folder on the e-mail server, and then the attachments are deleted after the selected period of time "N." The file record can include a pointer to the location of the original file that was attached, if desired. Also, in at least some embodiments, a user can be provided with an override option to override the automatic attachment deletion setting.

The foregoing exemplary embodiments have been provided for the purpose of explanation and are in no way to be construed as limiting this disclosure. This disclosure is not limited to the particulars disclosed herein, but extends to all embodiments within the scope of the appended claims, and any equivalents thereof.

The invention claimed is:

1. A method of removing attachments from sent e-mails, comprising:

providing a selectable e-mail setting to delete attachments from copies of e-mails saved in a sent folder on an e-mail server, such that an e-mail user is provided with choices as to when attachments are to be deleted, including at least choices of (a) prior to saving the sent e-mails and (b) a specific amount of time after the sent e-mails are saved, and also including at least choices of (c) deleting all attachments and (d) deleting only attachments larger than a selected size;

the e-mail user selecting whether attachments are to be automatically deleted from sent e-mails prior to saving the sent e-mails in the sent folder or selecting a specific amount of time before the attachments are to be automatically deleted, and the e-mail user also selecting whether all attachments or only attachments larger than a selected size are to be automatically deleted;

the e-mail user composing at least one e-mail to be sent out and attaching to the at least one e-mail at least one attachment of a copy of at least one document to be attached;

sending the at least one e-mail with the at least one attachment to at least one other e-mail user;

saving a copy of the at least one e-mail in the sent folder on the e-mail server either:

(a) without saving any of the at least one attachment if the e-mail user selected deleting prior to saving sent e-mails and with an indication including a pointer as to where the at least one document to be attached is stored, wherein the indication also includes name of the at least one document, size of the at least one document and type of the at least one document; or (b) with saving the at least one attachment, along with an indication including a pointer as to where the at least one document to be attached is stored, wherein the indication also includes name of the at least one document, size of the at least one document and type of the at least one document, and then deleting the at least one attachment after the specific amount of time providing the e-mail user an override option to override an automatic attachment deletion setting.

* * * * *